(12) United States Patent
Dry et al.

(10) Patent No.: US 10,857,913 B2
(45) Date of Patent: Dec. 8, 2020

(54) VEHICLE SEATING ASSEMBLY

(71) Applicant: Ford Global Technologies, LLC, Dearborn, MI (US)

(72) Inventors: Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 16/244,697

(22) Filed: Jan. 10, 2019

(65) Prior Publication Data

US 2020/0223329 A1   Jul. 16, 2020

(51) Int. Cl.
*B60N 2/14* (2006.01)
*B60N 2/07* (2006.01)
*B60N 2/06* (2006.01)

(52) U.S. Cl.
CPC ............. *B60N 2/143* (2013.01); *B60N 2/062* (2013.01); *B60N 2/0735* (2013.01); *B60N 2/146* (2013.01); *B60N 2/0715* (2013.01)

(58) Field of Classification Search
CPC ........ B60N 2/143; B60N 2/146; B60N 2/005; B60N 2/0735; B60N 2/0715; B60N 2/062; B60N 2/0732; B60N 2/0727; B60N 2/0224
See application file for complete search history.

(56) References Cited

U.S. PATENT DOCUMENTS

| | | | |
|---|---|---|---|
| 2,426,582 A | 9/1947 | Austin | |
| 4,184,656 A | 1/1980 | Wakeley | |
| 4,341,415 A * | 7/1982 | Braun | B60N 2/06 296/64 |
| 4,669,780 A * | 6/1987 | Sakakibara | B60N 2/0232 297/257 |
| 4,846,529 A * | 7/1989 | Tulley | B60N 2/0232 297/344.23 |
| 5,000,505 A | 3/1991 | Kawashita et al. | |
| 5,636,884 A | 6/1997 | Ladetto et al. | |
| 5,911,465 A * | 6/1999 | Yamamoto | B60N 2/01525 296/65.03 |
| 5,951,106 A | 9/1999 | Hirama et al. | |
| 6,168,234 B1 | 1/2001 | Haynes et al. | |
| 6,270,140 B1 | 8/2001 | Opfer et al. | |
| 6,457,765 B1 | 10/2002 | Bergquist et al. | |
| 6,629,721 B1 | 10/2003 | Macey | |
| 6,666,514 B2 | 12/2003 | Muraishi et al. | |
| 6,981,746 B2 | 1/2006 | Chung et al. | |

(Continued)

FOREIGN PATENT DOCUMENTS

DE   69920043 T2   9/2005
DE   102009033797 A1   3/2010

(Continued)

OTHER PUBLICATIONS

English translation of EP 3150426 (Year: 2017).*

*Primary Examiner* — Gregory A Blankenship
(74) *Attorney, Agent, or Firm* — David Coppiellie; Price Heneveld LLP

(57) ABSTRACT

A vehicle seating assembly includes a swivel assembly coupled to a seat base and a rail bracket. The swivel assembly can be external to an impact load-path and can include a ring gear and a spur gear.

20 Claims, 6 Drawing Sheets

(56) References Cited

U.S. PATENT DOCUMENTS

| | | | |
|---|---|---|---|
| 7,108,325 B2 * | 9/2006 | Williamson | A47C 3/18 297/344.22 |
| 7,252,319 B2 | 8/2007 | Toyota et al. | |
| 7,357,451 B2 | 4/2008 | Bendure et al. | |
| 7,441,822 B1 * | 10/2008 | Day | B60N 2/01541 296/65.01 |
| 7,658,258 B2 | 2/2010 | Denney | |
| 7,950,740 B2 * | 5/2011 | Bunea | B60N 2/146 297/344.21 |
| 8,152,231 B2 | 4/2012 | Larsen et al. | |
| 8,169,311 B1 | 5/2012 | Breed | |
| 8,382,057 B2 | 2/2013 | Napau et al. | |
| 9,114,730 B1 | 8/2015 | Hudson et al. | |
| 9,248,759 B2 | 2/2016 | Brand et al. | |
| 9,376,044 B2 | 6/2016 | Fujita et al. | |
| 9,688,164 B2 | 6/2017 | Vikstrom et al. | |
| 10,625,623 B2 * | 4/2020 | Lyon | H01R 13/639 |
| 10,759,305 B2 * | 9/2020 | Dry | B60N 2/005 |
| 10,773,612 B2 * | 9/2020 | Dry | B60N 2/062 |
| 2001/0038223 A1 * | 11/2001 | Suga | B60N 2/062 296/65.11 |
| 2001/0048237 A1 * | 12/2001 | Kassai | B60N 2/2878 297/256.12 |
| 2008/0001424 A1 * | 1/2008 | Gardiner | B60N 2/0735 296/64 |
| 2009/0014584 A1 | 1/2009 | Rudduck et al. | |
| 2009/0195037 A1 | 8/2009 | Plavetich et al. | |
| 2011/0062285 A1 | 3/2011 | Herzog et al. | |
| 2014/0167469 A1 * | 6/2014 | Haller | F16C 33/3856 297/344.12 |
| 2016/0039314 A1 * | 2/2016 | Anticuar | B60N 2/0875 248/429 |
| 2017/0166091 A1 | 6/2017 | Cziomer et al. | |
| 2017/0225593 A1 * | 8/2017 | De Saulles | B60N 2/01 |
| 2017/0253145 A1 * | 9/2017 | Runde | B60N 2/0715 |
| 2017/0267124 A1 * | 9/2017 | Numazawa | B60N 2/06 |
| 2018/0009348 A1 * | 1/2018 | Deshmukh | B60N 2/509 |
| 2018/0265136 A1 * | 9/2018 | Baccouche | B60N 2/14 |
| 2019/0126786 A1 * | 5/2019 | Dry | B60N 2/0806 |
| 2019/0263295 A1 * | 8/2019 | Dry | B60N 2/01 |
| 2019/0381914 A1 * | 12/2019 | Kaneko | A47C 3/02 |
| 2020/0001747 A1 * | 1/2020 | Faruque | B60N 2/933 |
| 2020/0039392 A1 * | 2/2020 | Kim | B60N 2/42736 |
| 2020/0079246 A1 * | 3/2020 | Jaradi | B60N 2/146 |
| 2020/0086768 A1 * | 3/2020 | Line | B60N 2/203 |
| 2020/0086769 A1 * | 3/2020 | Aktas | B60N 2/146 |
| 2020/0114785 A1 * | 4/2020 | Hagedorn | B60N 2/0292 |
| 2020/0223329 A1 * | 7/2020 | Dry | B60N 2/0735 |

FOREIGN PATENT DOCUMENTS

| | | | | |
|---|---|---|---|---|
| EP | 0615879 A1 | | 9/1994 | |
| EP | 3150426 A1 | | 4/2017 | |
| JP | 2008-290625 | * | 12/2008 | B60N 2/146 |
| JP | WO2013161620 | | 12/2015 | |

* cited by examiner

VEHICLE SEATING ASSEMBLY

FIELD OF THE DISCLOSURE

The present disclosure generally relates to vehicles. More specifically, the present disclosure relates to vehicle seating assemblies.

BACKGROUND

Vehicles are often provided with vehicle seating assemblies. However, the vehicle seating assemblies are typically limited in their configuration and mobility within the vehicle. Accordingly, additional solutions are needed that increase the versatility of the vehicles.

SUMMARY

According to a first aspect of the present disclosure, a vehicle seating assembly includes a swivel assembly coupled to a seat base and a rail bracket. The swivel assembly can be external to an impact load-path and can include a ring gear and a spur gear.

Embodiments of the first aspect of the present disclosure can include any one or a combination of the following features:
- anchors coupled to the rail bracket that engage with a rail system on a vehicle, the anchors being rotatable about a vertical axis;
- the vertical axis that the anchors are rotatable about is defined by a post of each of the anchors;
- the anchors are rotatable between a rail-engaged position and a rail-disengaged position;
- the rail-disengaged position is utilized to transition between tracks of the rail system;
- the tracks are longitudinal tracks and lateral tracks;
- the rail-disengaged position of the anchors for one of the longitudinal tracks and the lateral tracks is the rail-engaged position for the other of the longitudinal tracks and the lateral tracks;
- the rail bracket further includes a central platform positioned between legs of the rail bracket;
- the central platform is vertically raised relative to the legs;
- the ring gear is fixedly coupled to the central platform;
- bearings positioned between the seat base and the rail bracket;
- the bearings provide support to the seat base throughout a range of rotational displacement of the seat base; and
- the vehicle seating assembly is positioned within a vehicle.

According to a second aspect of the present disclosure, a vehicle seating assembly includes a swivel assembly coupled to a seat base and a rail bracket. The swivel assembly can be external to an impact load-path and include a ring gear and a spur gear. The rail bracket can include legs radiating from a central platform. Anchors coupled to the legs and can engage with a rail system on a vehicle. The anchors may be rotatable about a vertical axis.

Embodiments of the second aspect of the present disclosure can include any one or a combination of the following features:
- the vertical axis that the anchors are rotatable about is defined by a post of each of the anchors, the anchors being rotatable between a rail-engaged position and a rail-disengaged position; and
- the rail-disengaged position is utilized to transition between tracks of the rail system, wherein the tracks are longitudinal tracks and lateral tracks, and wherein the rail-disengaged position of the anchors for one of the longitudinal tracks and the lateral tracks is the rail-engaged position for the other of the longitudinal tracks and the lateral tracks.

According to a third aspect of the present disclosure, a vehicle includes a rail assembly in a floor. The rail assembly includes lateral and longitudinal tracks. A vehicle seating assembly includes a swivel assembly coupled to a seat base and a rail bracket. The swivel assembly includes a ring gear and a spur gear. The rail bracket includes legs that extend from a central platform. Anchors are coupled to the legs and engage with the rail assembly. The anchors are rotatable about a vertical axis.

Embodiments of the third aspect of the present disclosure can include any one or a combination of the following features:
- the anchors are rotatable between a rail-engaged position and a rail-disengaged position, wherein the rail-disengaged position of the anchors for one of the longitudinal tracks and the lateral tracks is the rail-engaged position for the other of the longitudinal tracks and the lateral tracks;
- the central platform is vertically raised relative to the legs; and
- the ring gear is fixedly coupled to the central platform.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
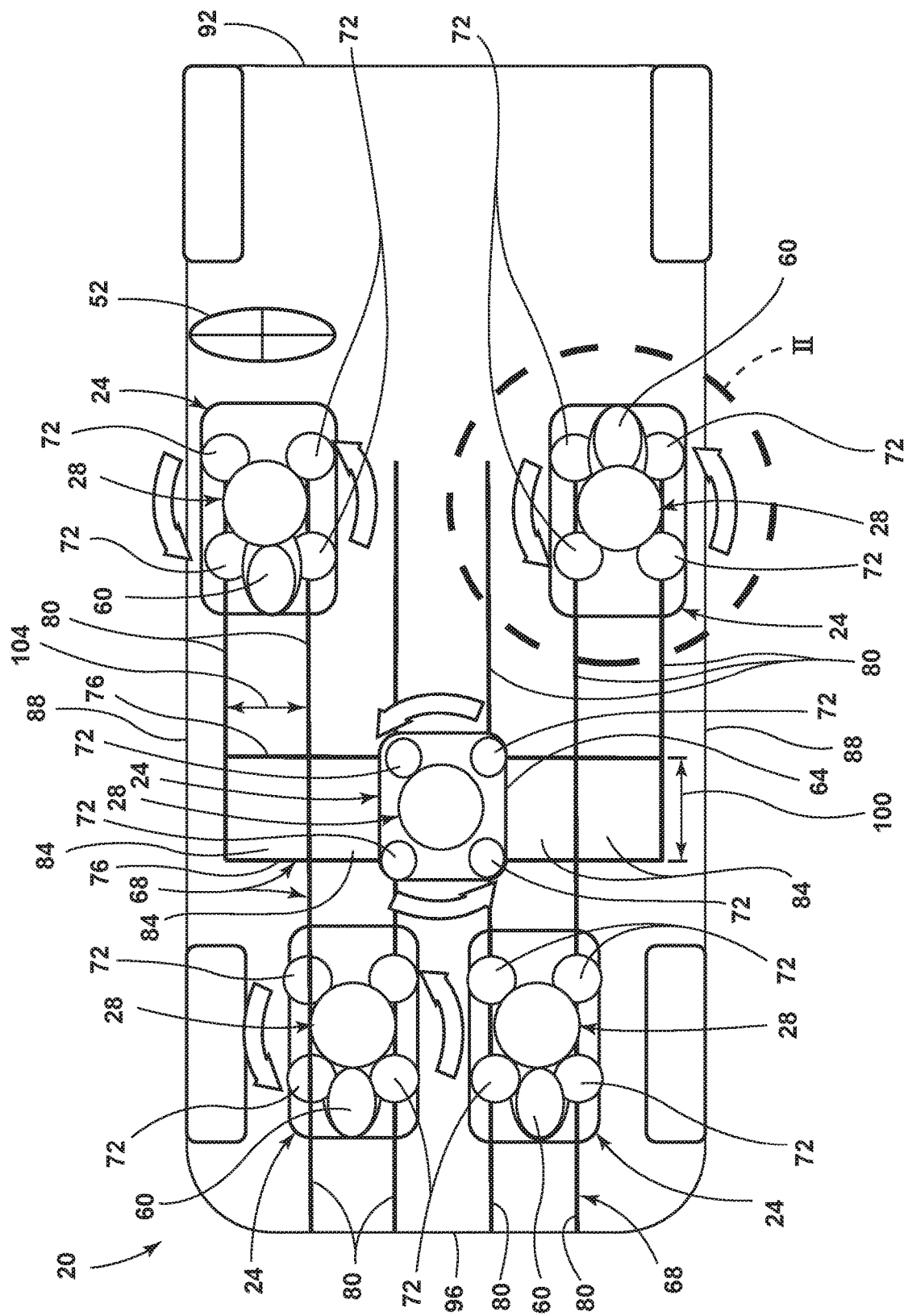
FIG. 1 is a top perspective view of a cabin of a vehicle, illustrating an interior configuration, according to one example.
Figure 4:
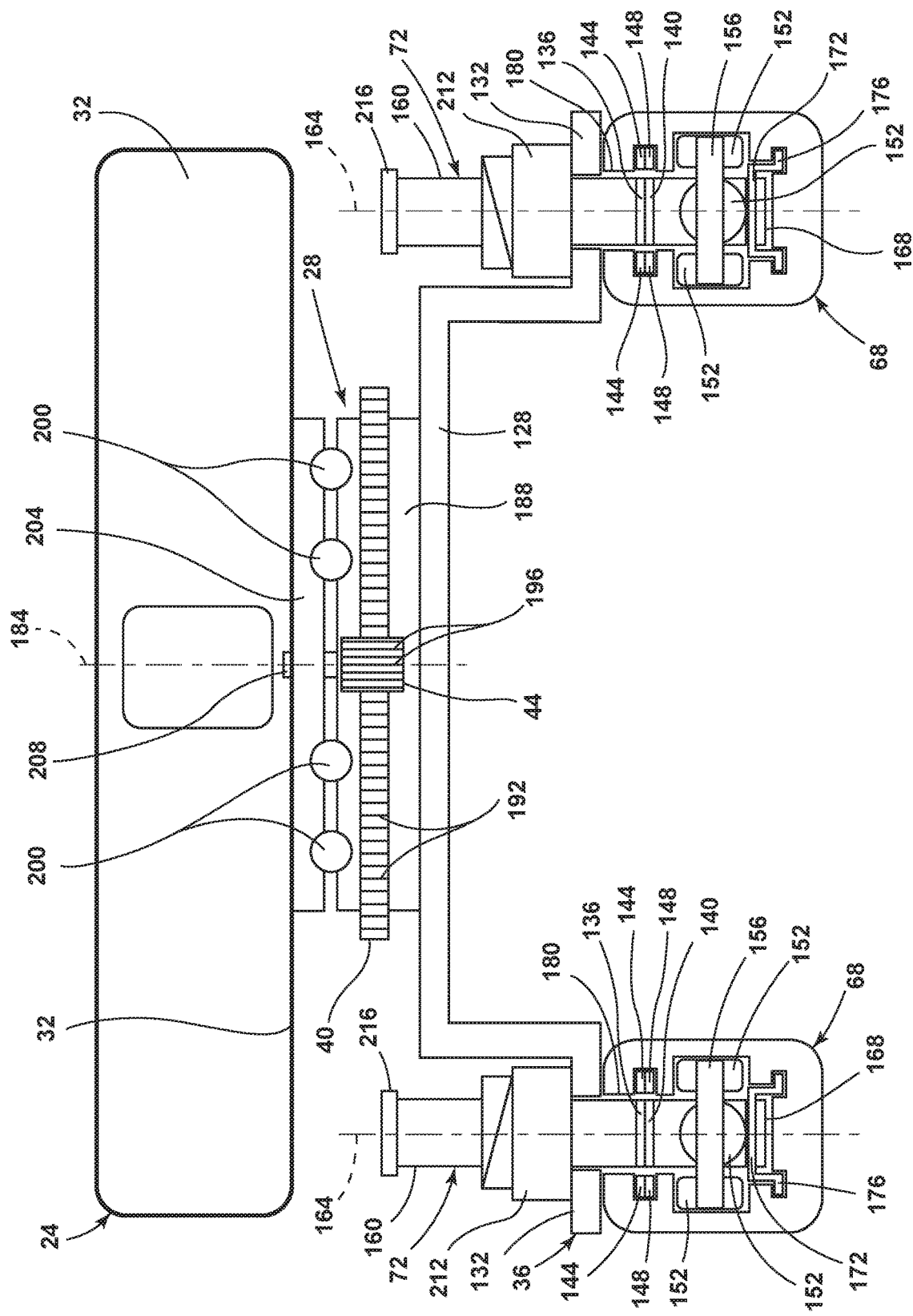
FIG. 4 is a cross-sectional view of the seating assembly, taken at line IV-IV of FIG. 3, illustrating an engagement between the seating assembly and the rail system, as well as a swivel assembly.

For purposes of description herein, the terms "upper," "lower," "right," "left," "rear," "front," "vertical," "horizontal," and derivatives thereof shall relate to the concepts as oriented in FIG. 1 or 4. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6, reference numeral 20 generally designates a vehicle. The vehicle 20 may be equipped with a vehicle seating assembly 24. The vehicle seating assembly 24 can include a swivel assembly 28. The swivel assembly 28 can be coupled to a seat base 32 and a rail bracket 36. The swivel assembly 28 may be positioned such that the swivel assembly 28 is external to an impact load-path. The swivel assembly 28 includes a ring gear 40 and a spur gear 44.

Referring again to FIG. 1, the vehicle 20 may be passenger driven, semi-autonomous, fully autonomous, or any combination of user-controlled and automated. For example, the semi-autonomous example of the vehicle 20 may perform many or all-commuting functions (e.g., accelerating, braking, turning, signaling, etc.) independent of user interaction while the user maintains override control of the vehicle 20. Accordingly, in some examples, the vehicle 20 may be provided with a steering wheel 52 that is positioned proximate to one of a plurality of the seating assemblies 24. The seating assemblies 24 may be configured to provide various functionality to an interior or cabin of the vehicle 20. For example, the seating assemblies 24 may be utilized to support a user 60 in a seated position. Additionally or alternatively, the seating assemblies 24 may be folded to provide an ottoman, a work surface, a table 64, or the like. The seating assemblies 24 are coupled to the rail system 68. In various examples, the seating assemblies 24 are coupled to a rail system 68 by a plurality of anchors 72. The anchors 72 can be positioned to permit actuation along lateral tracks 76 and longitudinal tracks 80 of the rail system 68. In some examples, the plurality of anchors 72 are positioned to permit actuation along the lateral tracks 76 and the longitudinal tracks 80 without adjusting a longitudinal position or a lateral position of the plurality of anchors 72 relative to one another. Said another way, the anchors 72 on an individual vehicle seating assembly 24, in some examples, may remain fixed relative to one another in the lateral and longitudinal directions. While the anchors 72 may be fixed relative to one another, that does not exclude the ability of the anchors 72 to move within the rail system 68 and/or be provided with components that are movable (e.g., rollers, wheels, locking pins, etc.), as will be discussed in more detail herein.

Referring further to FIG. 1, the lateral tracks 76 and the longitudinal tracks 80 connect with one another at an angle at junctions 84. For example, the lateral tracks 76 and the longitudinal tracks 80 may meet at an angle of about ninety degrees (90°) to define the junctions 84. Alternatively, the lateral tracks 76 and the longitudinal tracks 80 may meet at angles that are greater than or less than about ninety degrees (90°) without departing from the concepts disclosed herein. In general, the lateral tracks 76 and the longitudinal tracks 80 are in a generally planar relationship with one another, Said another way, the rail system 68, which includes the lateral tracks 76 and the longitudinal tracks 80, are configured to have corresponding heights and thicknesses to enable smooth and seamless transfer of the vehicle seating assemblies 24 and their associated anchors 72 throughout the extent of the rail system 68 without resulting in binding or sticking of the anchors 72 within the rail system 68.

Referring still further to FIG. 1, the vehicle seating assemblies 24 may traverse a cabin of the vehicle 20 along the rail system 68 laterally between sides 88 of the vehicle 20 and/or longitudinally from a front 92 to a back 96 of the vehicle 20. The rail system 68 includes one or more of the lateral tracks 76 and one or more of the longitudinal tracks 80 to facilitate the lateral and longitudinal movements of the vehicle seating assemblies 24, respectively. The longitudinal tracks 80 may be symmetrically disposed about a longitudinal axis of the vehicle 20. The vehicle seating assemblies 24 may be actuated along the rail system 68 to assume a variety of configurations. For example, the vehicle seating assemblies 24 may be arranged as a second row of seats. The second row of seats may include a center seating assembly that is flanked on either side by outboard seating assemblies. The outboard seating assemblies may alternatively be referred to as first and third seating assemblies while the center seating assembly may alternatively be referred to as a second seating assembly. In some examples, the center seating assembly may be actuated in a direction toward the front 92 of the vehicle 20 to be used as a center console or additional seating in a first row of seats. The center seating assembly may be a fold-flat seating assembly and/or may include a work surface. The work surface may be a fold out tabletop or desk that has a surface area at least equal to a surface area of the seatback of the center seating assembly. With the center seating assembly positioned in the first row of seats, the outboard seating assemblies in the second row of seats may be actuated toward one another along the lateral tracks 76 such that the outboard seating assemblies are adjacent or in close proximity to one another. In some examples, the center seating assembly may be removed from the vehicle 20 to permit actuation of the outboard seating assemblies toward one another rather than actuating the center seating assembly toward the first row of seats. For example, the center seating assembly, or any other vehicle seating assembly 24 in the vehicle 20, may be actuated along the longitudinal tracks 80 toward the back 96 of the vehicle 20 and removed from an access door located there, such as a liftgate. Alternatively, the vehicle seating assemblies 24 may be removed by actuation along the lateral tracks 76 from an access door on one of the sides 88 of the vehicle 20, such as a side-door. In various examples, the anchors 72 may be disengaged from the rail system 68 and the vehicle seating assembly 24 may be lifted out of the rail system 68.

Referring yet again to FIG. 1, once the outboard seating assemblies have been actuated toward one another such that the outboard seating assemblies are adjacent to one another, then the outboard seating assemblies may be actuated rearward toward the back 96 of the vehicle 20 along the longitudinal tracks 80. Accordingly, the outboard seating assemblies may be transitioned from the second row of seats to a third row of seats, as shown in FIG. 1. The outboard seating assemblies are configured to fit entirely within a distance between a pair of rearward wheel wells of the vehicle 20 as the third row of seats. For example, the outboard seating assemblies may fit entirely within the distance between the pair of rearward wheel wells and be generally aligned with a rear axle that couples the wheel assemblies toward the back 96 of the vehicle 20. Additionally, the longitudinal tracks 80 of the rail system 68 are configured to allow actuation of the outboard seating assemblies to be positioned entirely between the rearward wheel wells of the vehicle 20 and entirely rearward of their former positions in the second row of seats. When the outboard seating assemblies are actuated from the second row of seats to the third row of seats, the outboard seating assemblies may be translated in a rearward direction along the longitudinal tracks 80 at least about 10 cm, at least about 15 cm, at least about 20 cm, at least about 25 cm, at least about 30 cm, at least about 35 cm, at least about 40 cm, at least about 45 cm, at least about 50 cm, and/or combinations or ranges thereof. Accordingly, the center seating assembly may be actuated from the first row of seats rearward to the original position of the center seating assembly in the second row of seats while the outboard seating assemblies remain in the third row of seats. In such a position, the center seating assembly may be utilized for a variety of functionalities that include, but are not limited to, a seating position, an ottoman, a work surface, an entertainment interface, a center console, and/or a storage area. The occupants of the outboard seating assemblies may utilize the center seating assembly as positioned in FIG. 1 as the ottoman, the work surface, the entertainment interface, and/or the storage area; however, the present disclosure is not so limited. The center seating assembly may be actuated along the lateral tracks 76 to any location the occupants of the third row of seats desire. In some examples, the center seating assembly may be actuated to the third row of seats to increase space in the second row of seats for the outboard seating assemblies.

Referring further to FIG. 1, at the junction 84, the lateral tracks 76 and the longitudinal tracks 80 may bisect one another. Accordingly, when the anchors 72 are properly positioned at one of the junctions 84, the anchors 72 may be transitioned from the lateral track 76 to the longitudinal track 80 or vice versa with equal ease by actuating the seating assembly 24 either toward or along the lateral track 76 or toward or along the longitudinal track 80. A distance 100 between the lateral tracks 76 and a distance 104 between the longitudinal tracks 80 may generally correspond to one another. Accordingly, as the anchors 72 transition between the lateral tracks 76 and the longitudinal tracks 80 binding or catching of the anchors 72 at the junctions 84 is avoided, thereby providing a smooth operation and actuation of the seating assemblies 24 along the rail system 68 to a variety of seating positions and seating orientations. It is contemplated that the angular orientation of the lateral tracks 76 and the longitudinal tracks 80 may have an impact on transitions between the lateral tracks 76 and the longitudinal tracks 80. Therefore, the positioning and/or spacing of the anchors 72 relative to one another may be provided such that a large degree of customization in the configuring of the vehicle 20 is possible. Additionally or alternatively, the anchors 72 may be adjustable in lateral, longitudinal, and/or vertical directions to facilitate transitions between lateral tacks 76 and longitudinal tracks 80 that may differ in the spacing or distances 100, 104.

Figure 2:
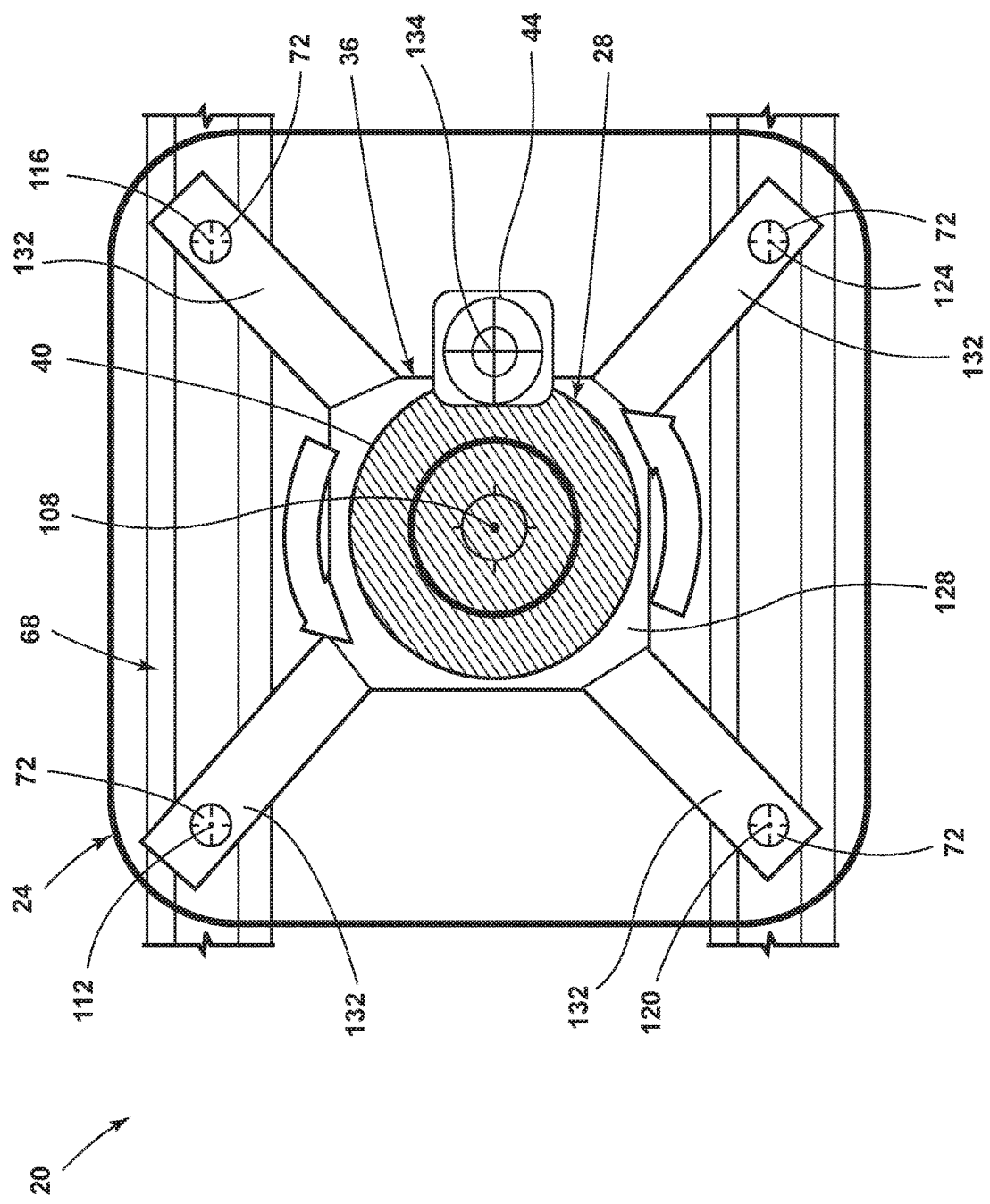
FIG. 2 is an expanded top view of a seating assembly in a first position, taken at region II of FIG. 1, illustrating an engagement between the seating assembly and a rail system.
Figure 3:
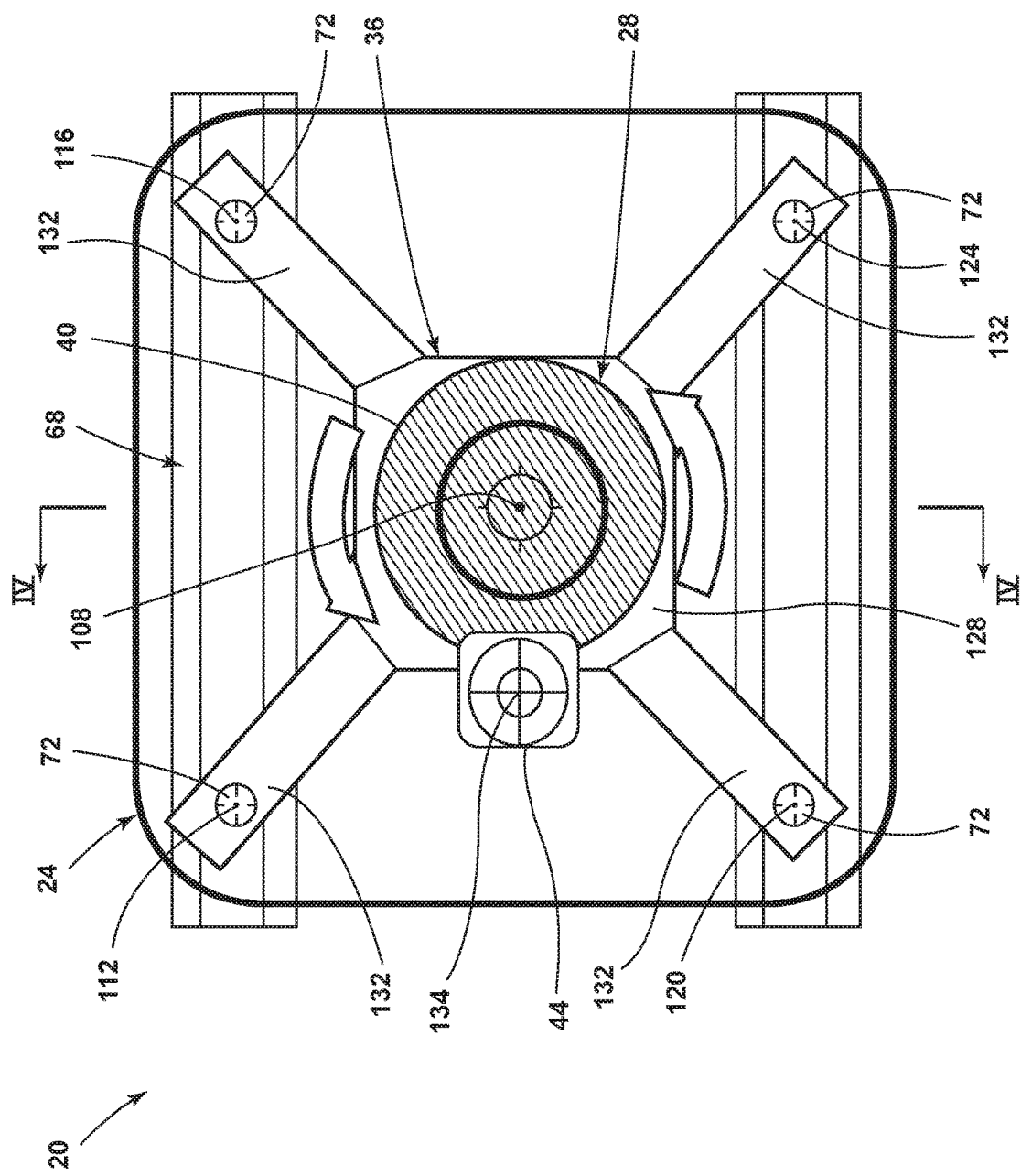
FIG. 3 is an expanded top view of the seating assembly in a second position, taken at region II of FIG. 1, illustrating an engagement between the seating assembly and a rail system.

Referring now to FIGS. 2 and 3, transitioning one of the vehicle seating assemblies 24 from a front-facing position (FIG. 2) to a rear-facing position (FIG. 3) can be accomplished by actuating the swivel assembly 28 such that the vehicle seating assembly 24 is rotationally displaced by about one-hundred-eighty degrees (180°). The rotation of the vehicle seating assembly 24 by the swivel assembly 28 can be a rotation about a vertical axis that is positioned within a lateral cross-section of the vehicle seating assembly 24 (e.g., a vertical axis through a horizontal center point of the seat base 32). The anchors 72 are coupled to the rail bracket 36 and engage with the rail system 68 on the vehicle 20. Each of the anchors 72 can be rotated about a vertical axis that differs from each other and that differs from the vertical axis about which the swivel assembly 28 rotates. For example, the swivel assembly 28 may rotate about a first rotational axis 108 and each of the anchors 72 may rotate about their own vertical axis, such as second, third, fourth, and fifth rotational axes 112, 116, 120, 124. The anchors 72 can be positioned proximate radial extremes of the rail bracket 36. For example, the rail bracket 36 may be provided with a central platform 128 positioned between legs 132 of the rail bracket 36. In examples where the anchors 72 are positioned proximate radial extremes of the rail bracket 36, the anchors 72 may be positioned proximate ends of the legs 132 that are radially spaced from the central platform 128. In various examples, the legs 132 extend radially outward or radiate outward from the central platform 128. In some examples, the central platform 128 may be vertically raised relative to the legs 132. The ring gear 40 can be coupled to the central platform 128. For example, the ring gear 40 can be fixedly coupled to the central platform 128. In general, the spur gear 44 may traverse a circumference or perimeter of the ring gear 40 as the swivel assembly 28 is operated or actuated to rotationally displace the vehicle seating assembly 24 about the first rotational axis 108. The spur gear 44 may accomplish the traversal of the perimeter of the ring gear 40 by rotating about a vertical axis, such as a sixth rotational axis 134, that may be positioned at or near a center point of the spur gear 44 along a horizontal plane of the spur gear 44. The rotational motion of the spur gear 44 relative to the ring gear 40 may be induced my a motor coupled to the spur gear 44 and engagable by a user (e.g., by actuation of a button). Alternatively, the rotational motion of the spur gear 44 relative to the ring gear 40 may be induced by a user applying a generally tangential resultant force to the vehicle seating assembly 24 and disengaging a swivel lock (e.g., by actuating a release lever or release handle). For example, a user may be seated in the vehicle seating assembly 24, disengage a swivel lock by actuating a release lever, and pushing on the floor of the cabin of the vehicle 20 in a lateral direction to induce rotational displacement of the spur gear 44 along the ring gear 40 and ultimately adjust the rotational positioning of the vehicle seating assembly 24.

Figure 5:
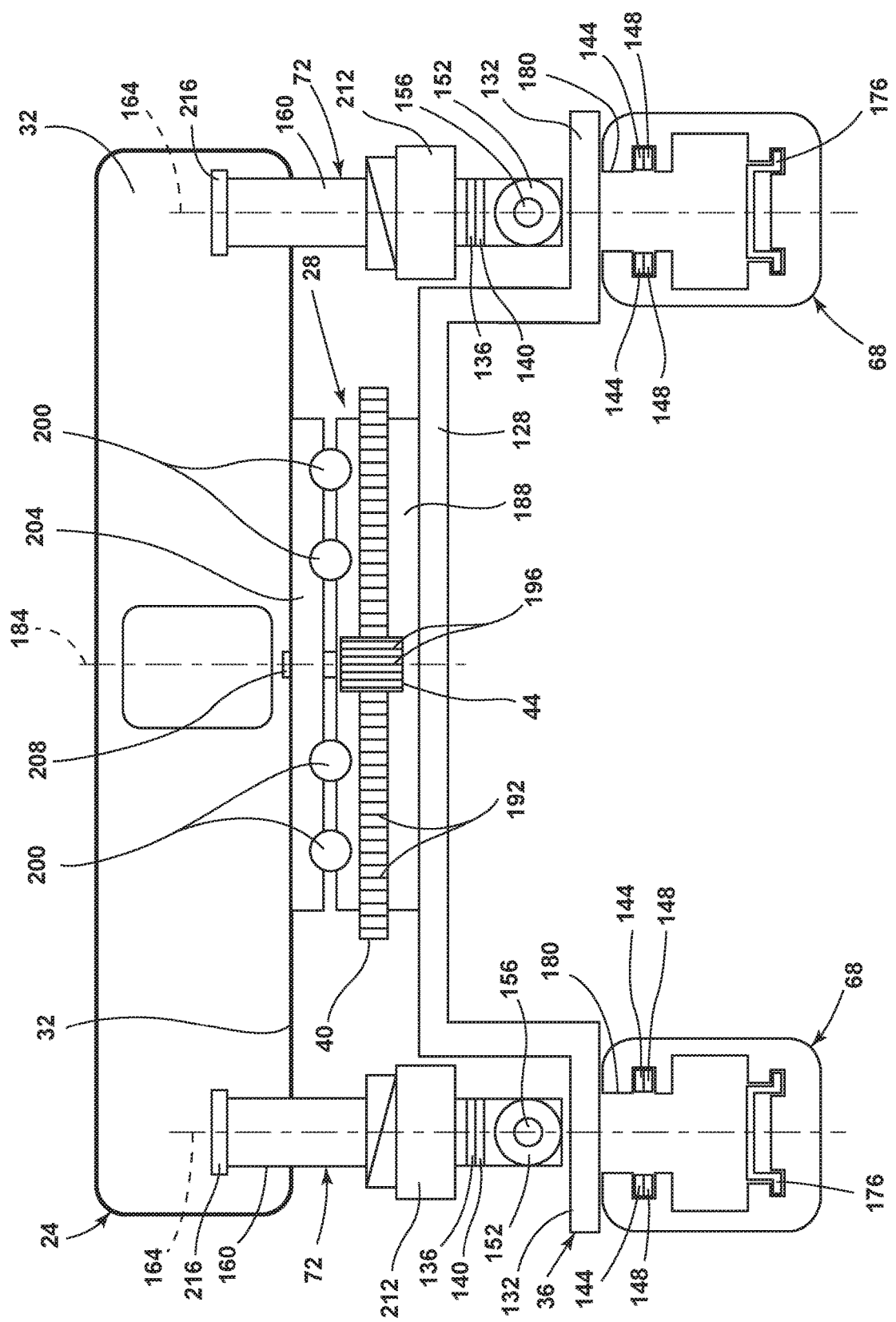
FIG. 5 is a cross-sectional view of the seating assembly, taken at line IV-IV of FIG. 3, illustrating anchors of the seating assembly in a raised position, according to one example.
Figure 6:
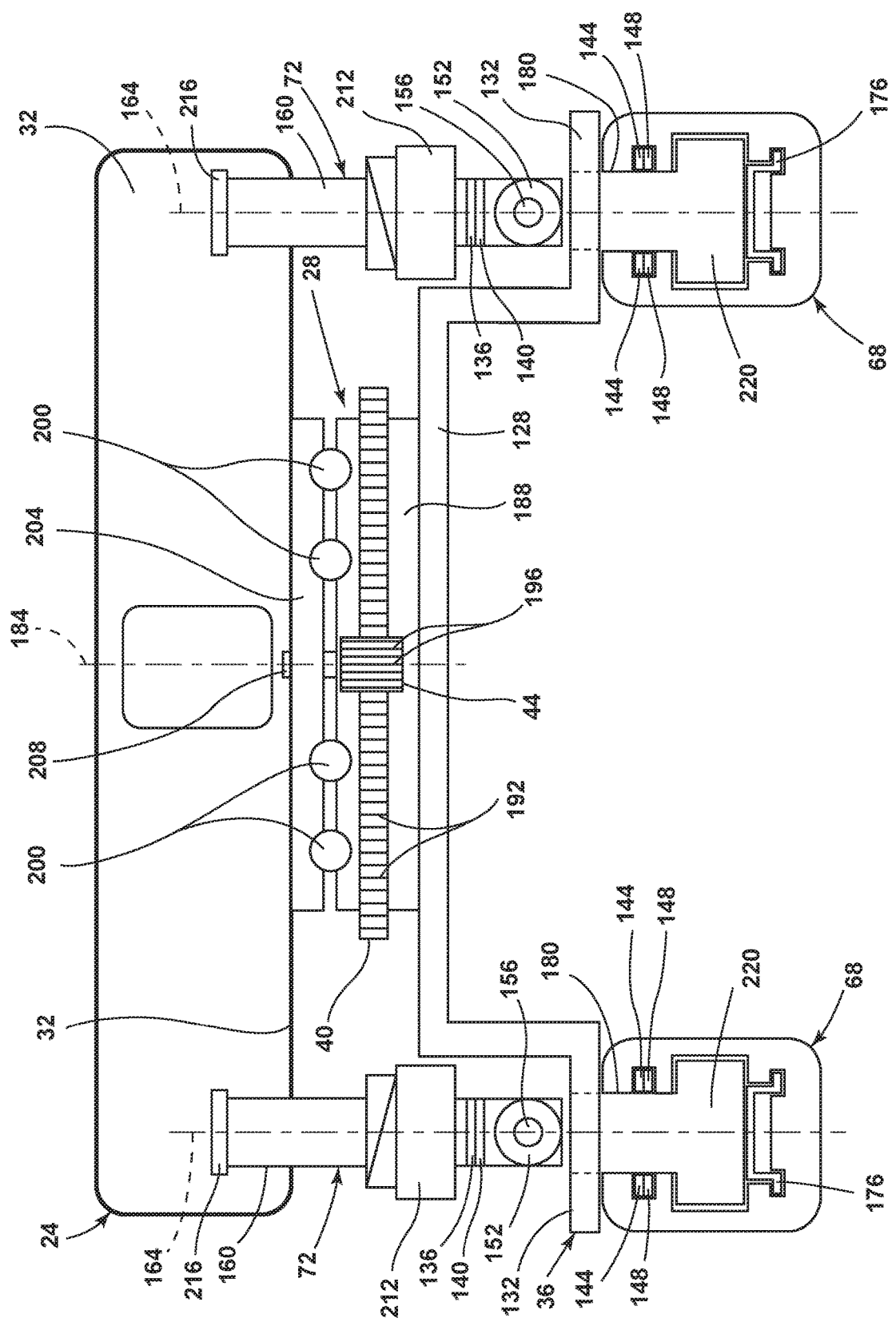
FIG. 6 is a cross-sectional view of the seating assembly, taken at line IV-IV of FIG. 3, illustrating anchors of the seating assembly in a raised position, according to another example.

Referring to FIGS. 4-6, the vehicle seating assemblies 24 can be provided with an actuation carriage coupled to an underside thereof. For example, the actuation carriage may be coupled to an underside of the seat base 32 or to an underside of a pair of seat tracks. The pair of seat tracks can enable horizontal actuation of the vehicle seating assembly 24 along the seat tracks relative to the anchors 72 without adjusting a lateral or longitudinal position of the anchors 72 within the rail system 68. The plurality of anchors 72 can include active anchors and/or passive anchors. The active anchors are provided with power and data connections that can communicate with controllers and onboard computer modules to convey various information about the vehicle seating assembly 24 (e.g., lateral position, longitudinal position, rotational position, occupancy status, comfort settings or preferences, various safety statuses, etc.) as well as provide power to various powered components that can be provided on the vehicle seating assemblies 24 (e.g., heating and ventilating of the vehicle seating assembly 24, seat adjustment motors, safety features, safety sensors, entertainment features, etc.). The power and data connections to the vehicle seating assemblies 24 can be facilitated by a power connector 136 and a data connector 140, respectively, that are provided on one or more of the active anchors. The power and data connectors 136, 140 are positioned and configured to engage with power sources 144 and data transmitters 148 that are provided in the rail system 68. The power and data connectors 136, 140 are electrically coupled to the various components within the vehicle seating assemblies 24 that are powered and/or monitored. The anchors 72 are each provided with rollers 152 that are positioned on either side of an axle 156 so as to allow the anchors 72 to roll along the rail system 68 and/or along a floor surface of the vehicle 20. The axle 156 is coupled to, and supported by, a post 160 that engages with the axle 156 in a generally perpendicular fashion.

Referring again to FIGS. 4-6, the anchors 72 are configured to permit rotation of the post 160 about a vertical axis 164 (e.g., second, third, fourth, and/or fifth rotational axes 112, 116, 120, 124) such that the rollers 152 can selectively engage, and be oriented with, the lateral tracks 76 and the longitudinal tracks 80 as the vehicle seating assembly 24 traverses the rail system 68. The rotation of the post 160 about the vertical axis 164 can be facilitated by a hand-actuated control (e.g., lever) or a powered control (e.g., motor). In either instance, all or part of the anchor 72 can rotate about the vertical axis 164. The power and data connectors 136, 140 can circumferentially extend from an exterior surface of the post 160 such that the power and data connectors 136, 140 can engage with the power sources 144 and the data transmitters 148, respectively, independent of a rotational position of the anchor 72. The anchors 72 can be engaged with a support structure. For example, the anchors 72 may be provided with a plurality of flanges that bracket upper and lower surfaces of the support structures such that the anchor 72 rotatably engages with the support structure while also being retained to the support structure.

Referring further to FIGS. 4-6, the anchors 72 can be provided with a locking pin 168 that passes through the post 160. For example, the anchors 72 that are active anchors can be provided with the locking pin 168 while the locking pin 168 is omitted from the passive anchors. The locking pin 168 can be selectively engaged with one of a plurality of pin apertures 172 that are provided in a lower portion 176 of the lateral tracks 76 and/or the longitudinal tracks 80. The locking pin 168 can be actuated between a raised position (unlocked) to a lowered position (locked). The actuation of the locking pin 168 can be accomplished by a hand-actuated control or a motorized control. The rotation of the anchor 72 about the vertical axis 164 can be utilized in engaging and disengaging the vehicle seating assemblies 24 from the rail system 68. For example, the rollers 152 can be rotated about the vertical axis 164 to be coaxially aligned with a slot 180 in an upper portion of the rail system 68. In such an orientation, the rollers 152 can be removed from the rail system 68 by removing the vehicle seating assembly 24 from the vehicle 20. Similarly, the vehicle seating assembly 24 can be installed in the vehicle 20 by inserting the rollers 152 through the slot 180 and affecting a ninety-degree (90°) rotation of the rollers 152 by rotating the anchor 72 such that the rollers 152 nest within the structure of the lateral and/or longitudinal tracks 76, 80.

Referring yet again to FIGS. 4-6, the anchors 72 are rotatable between at least a rail-engaged position (FIG. 4) and a rail-disengaged position (FIGS. 5 and 6). In some examples, the rail-disengaged position of the anchors 72 may be utilized to transition between the lateral tracks 76 and the longitudinal tracks 80 of the rail system 68. For example, the anchors 72 may be rotated to the rail-disengaged position and the vehicle seating assembly 24 may then be lifted out of the rail system 68 and recoupled to the rail system 68 at an alternative location along the rail system 68. Alternatively, the rail-disengaged position of the anchors 72 for one of the lateral tracks 76 and the longitudinal tracks 80 may be the rail-engaged position for the other of the lateral tracks 76 and the longitudinal tracks 80. Said another way, the anchors 72 may be rotated from a rail-engaged position to a rail-disengaged position at the junctions 84 such that the vehicle seating assembly 24 may be transitioned between the lateral and longitudinal tracks 76, 80. For example, the vehicle seating assembly 24 can be actuated along one of the longitudinal tracks 80 with the anchors 72 in the rail-engaged position, then upon reaching one of the junctions 84, the anchors 72 can be rotated to the rail-disengaged position relative to the longitudinal tracks 80. The rail-disengaged position relative to the longitudinal tracks 80 can be the rail-engaged position relative to the lateral tracks 76. Accordingly, once the anchors 72 have been rotated at the junction 84, the vehicle seating assembly 24 can be actuated along the lateral tracks 76 without having to remove the vehicle seating assembly 24 from the rail system 68. Therefore, the rotation of the anchors 72 about the vertical axis 164 can be particularly beneficial. In addition to the rotation of the anchors 72, the swivel assembly 28 is rotatable about a vertical axis 184 that is offset from the vertical axis 164 of rotation of the anchors 72.

Referring further to FIGS. 4-6, the ring gear 40 may radially extend from a pedestal 188 on the central platform 128. The ring gear 40 includes teeth 192 that are engaged by teeth 196 on the spur gear 44. The engagement between the teeth 192 on the ring gear 40 and the teeth 196 on the spur gear 44 may serve as at least part of the swivel lock that prevents inadvertent or unintended rotational motion of the vehicle seating assembly 24 about the vertical axis 184 of the swivel assembly 28. Bearings 200 may be positioned between the seat base 32 and the rail bracket 36. For example, the bearings 200 may be positioned between the pedestal 188 and a base plate 204 of the seat base 32. The spur gear 44 may be coupled to the base plate 204 by a shaft 208. The spur gear 44 can rotate about the shaft 208. Alternatively, the shaft 208 may be driven (e.g., by a motor or by a user applying a lateral force to the vehicle seating assembly 24) to rotate and the spur gear 44 may be fixed to the shaft 208 such that rotational motion of the shaft 208 is imparted to the spur gear 44. In various examples, the bearings 200 provide support to the seat base 32 throughout a range of rotational displacement of the seat base 32. Said another way, the bearings 200 may be positioned such that the seat base 32 is evenly or generally evenly supported in horizontal and/or radial directions in an effort to evenly distribute the weight of the vehicle seating assembly 24 and any user that may be occupying the vehicle seating assembly 24 as well as decrease a coefficient of friction for the rotational motion about the swivel assembly 28.

Referring still further to FIGS. 4-6, the anchors 72 may be provided flanges 212 that bear against a top surface of the legs 132 when the anchors 72 are in a lowered position (FIG. 4). The flanges 212 can be utilized to control a vertical depth of the anchors 72 within the rail system 68. The flanges 212 may also be utilized as dampeners to lessen jostling or impacts (e.g., from potholes, road debris, etc.) being transferred to the occupant of the vehicle seating assembly 24. The anchors 72 may also include protuberances 216 that may be acted on by a lifting mechanism to raise the anchors 72 out of the rail system 68. In some examples, guide pins 220 may engage with the rail system 68 in a non-removable fashion. The guide pins 220 may be initially engaged with the rail system 68 by inserting the guide pins 220 into the lateral or longitudinal tracks 76, 80 at an open or free end (e.g., the front 92, the back 96, or the sides 88 of the vehicle 20). The guide pins 220 enable the vehicle seating assembly 24 to remain locked or vertically retained to the rail system 68 regardless of whether the anchors 72 are in the raised or lowered position. In various examples, the anchors 72 may couple to the rail bracket 36 in a pass-through or transient manner. In such examples, the anchors 72 may be coupled to the seat base 32 and capable of extension from the seat base 32 to engage with the rail system 68 and retraction toward the seat base 32 to disengage from the rail system 68. The disengagement from the rail system 68 in such an example allows the seat base 32 to rotate about the swivel assembly 28 while the guide pins 220 retain the vehicle seating assembly 24 securely to the rail system 68. The guide pins 220 may include the locking pins 168 that can extend into the pin apertures 172 to retain the vehicle seating assembly 24 at a horizontal location within the rail system 68. In some examples, the anchors 72 may be provided with the rollers 152 on more than two sides of the anchors 72 (see FIG. 4). Said another way, the anchors 72 may be provided with more than two rollers 152 (e.g., three rollers 152 or four rollers 152). In such examples, the additional rollers 152 may aid in supporting the vehicle seating assembly 24 through rotational motion about the swivel assembly 28 by having the rollers 152 available to engage with a floor surface of the cabin as the vehicle seating assembly 24 is rotated.

Swivel assemblies that are crash or impact rated for vehicles 20 tend to be heavy, expensive, and present considerable challenges when packaging the assemblies into the vehicle 20. One reason for the weight and expense of these swivel assemblies is that the swivel assemblies are in a load-path of the vehicle seating assembly 24. When the swivel assembly is in the load-path, seat belt loads during a crash or impact event can be transferred to the swivel assembly. Accordingly, the swivel assembly is manufactured and constructed to the same high strength standards as the frame or structure of the seating assembly. However, the swivel assembly 28 and the vehicle seating assembly 24 of the present disclosure are designed to position the swivel assembly 28 external to an impact load-path. The positioning of the swivel assembly 28 below the seat base 32 and employing the rail bracket 36 results in the swivel assembly 28 supporting the vehicle seating assembly 24 when the anchors 72 are disengaged from the rail system 68, when the vehicle seating assembly 24 is unoccupied, and/or when there is limited risk or chance of an impact or crash load. For example, once the vehicle seating assembly 24 is rotated from forward-facing to rearward-facing or from rearward-facing to forward-facing, the anchors 72 are reengaged with the rail system 68 and the swivel assembly 28 is again external to the load-path. Accordingly, the swivel assembly 28 provides additional configuration possibilities while doing so in a low weight, low cost, and packaging efficient manner.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be rioted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
 a swivel assembly coupled to a seat base and a rail bracket, the swivel assembly being external to an impact load-path and comprising a ring gear and a spur gear;
 anchors coupled to the rail bracket that engage with a rail system on a vehicle, the anchors being rotatable about a vertical axis; and
 a plurality of rollers coupled to each of the anchors such that a coefficient of friction between the anchors and the rail system is decreased when the anchors are actuated along the rail system.

2. The vehicle seating assembly of claim 1, wherein the vertical axis that the anchors are rotatable about is defined by a post of each of the anchors.

3. The vehicle seating assembly of claim 1, wherein the anchors are rotatable between a rail-engaged position and a rail-disengaged position.

4. The vehicle seating assembly of claim 3, wherein the rail-disengaged position is utilized to transition between tracks of the rail system.

5. The vehicle seating assembly of claim 4, wherein the tracks are longitudinal tracks and lateral tracks.

6. The vehicle seating assembly of claim 5, wherein the rail-disengaged position of the anchors for one of the longitudinal tracks and the lateral tracks is the rail-engaged position for the other of the longitudinal tracks and the lateral tracks.

7. The vehicle seating assembly of claim 1, wherein the rail bracket further comprises:
 a central platform positioned between legs of the rail bracket.

8. The vehicle seating assembly of claim 7, wherein the central platform is vertically raised relative to the legs.

9. The vehicle seating assembly of claim 7, wherein the ring gear is fixedly coupled to the central platform.

10. The vehicle seating assembly of claim 1, further comprising:
 bearings positioned between the seat base and the rail bracket.

11. The vehicle seating assembly of claim 10, wherein the bearings provide support to the seat base throughout a range of rotational displacement of the seat base.

12. The vehicle seating assembly of claim 1, wherein the vehicle seating assembly is positioned within a vehicle.

13. A vehicle seating assembly, comprising:
 a swivel assembly coupled to a seat base and a rail bracket, the swivel assembly being external to an impact load-path and comprising a ring gear and a spur gear, the rail bracket comprising legs radiating from a central platform; and
 anchors coupled to the legs and engaging with a rail system on a vehicle, the anchors being rotatable about a vertical axis, wherein the anchors are each provided with a flange that bears against a top surface of the legs of the rail bracket when the anchors are in a lowered position.

14. The vehicle seating assembly of claim 13, wherein the flange on each of the anchors controls a vertical depth of the anchors within the rail system, and wherein the flange on each of the anchors dampens impacts imparted to the anchors.

15. The vehicle seating assembly of claim 13, wherein the vertical axis that the anchors are rotatable about is defined by a post of each of the anchors, the anchors being rotatable between a rail-engaged position and a rail-disengaged position.

16. The vehicle seating assembly of claim 15, wherein the rail-disengaged position is utilized to transition between tracks of the rail system, wherein the tracks are longitudinal tracks and lateral tracks, and wherein the rail-disengaged position of the anchors for one of the longitudinal tracks and the lateral tracks is the rail-engaged position for the other of the longitudinal tracks and the lateral tracks.

17. A vehicle, comprising:
 a rail system in a floor and comprising lateral and longitudinal tracks;
 a vehicle seating assembly having a swivel assembly coupled to a seat base and a rail bracket, the swivel assembly comprising a ring gear and a spur gear, the rail bracket comprising legs that extend from a central platform;

anchors coupled to the legs, wherein the legs engage with the rail assembly and are rotatable about a vertical axis, wherein the anchors are each provided with a flange that bears against a top surface of the legs of the rail bracket when the anchors are in a lowered position; and a plurality of rollers coupled to each of the anchors such that a coefficient of friction between the anchors and the rail system is decreased when the anchors are actuated along the rail system.

18. The vehicle of claim 17, wherein the anchors are rotatable between a rail-engaged position and a rail-disengaged position, and wherein the rail-disengaged position of the anchors for one of the longitudinal tracks and the lateral tracks is the rail-engaged position for the other of the longitudinal tracks and the lateral tracks.

19. The vehicle of claim 17, wherein the central platform is vertically raised relative to the legs.

20. The vehicle of claim 17, wherein the ring gear is fixedly coupled to the central platform.

* * * * *